(12) United States Patent
Taylor

(10) Patent No.: US 6,791,825 B1
(45) Date of Patent: Sep. 14, 2004

(54) TABLET COMPUTER HOUSING AND METHOD OF CONSTRUCTION

(75) Inventor: Alan R. Taylor, Parrish, FL (US)

(73) Assignee: Pro-Design Solutions LLC, Sarasota, FL (US)

( * ) Notice: Subject to any disclaimer, the term of this patent is extended or adjusted under 35 U.S.C. 154(b) by 57 days.

(21) Appl. No.: 10/316,552

(22) Filed: Dec. 10, 2002

(51) Int. Cl.$^7$ ................................................ G06F 1/16
(52) U.S. Cl. ...................................... 361/681; 361/683
(58) Field of Search ............................... 361/681, 683, 361/686

(56) References Cited

U.S. PATENT DOCUMENTS 5,583,742 A * 12/1996 Noda et al. .................. 361/683
6,654,232 B1 * 11/2003 Tsao et al. ................... 361/681

* cited by examiner

Primary Examiner—Yean-Hsi Chang
(74) Attorney, Agent, or Firm—Charles J. Prescott

(57) ABSTRACT

A tablet computer housing assembly and housing construction method. A molded front housing has a planar perimeter margin and a front opening for viewing a LCD screen which is sealingly mounted within the housing assembly. A front sealing bracket having an open central portion is rigidly connected along an outer margin thereof to, and forms a seal with, the perimeter margin of the front housing. A molded rear housing having a planar perimeter margin and a rear sealing bracket and having an open central portion is rigidly connected to, and forms a seal with the perimeter margin of the rear housing. A flat compressible main sealing gasket having an open central portion is positioned between the front and rear sealing brackets to form a sealed connection therebetween whereby a sealed interior volume is established within the mating housings.

14 Claims, 9 Drawing Sheets

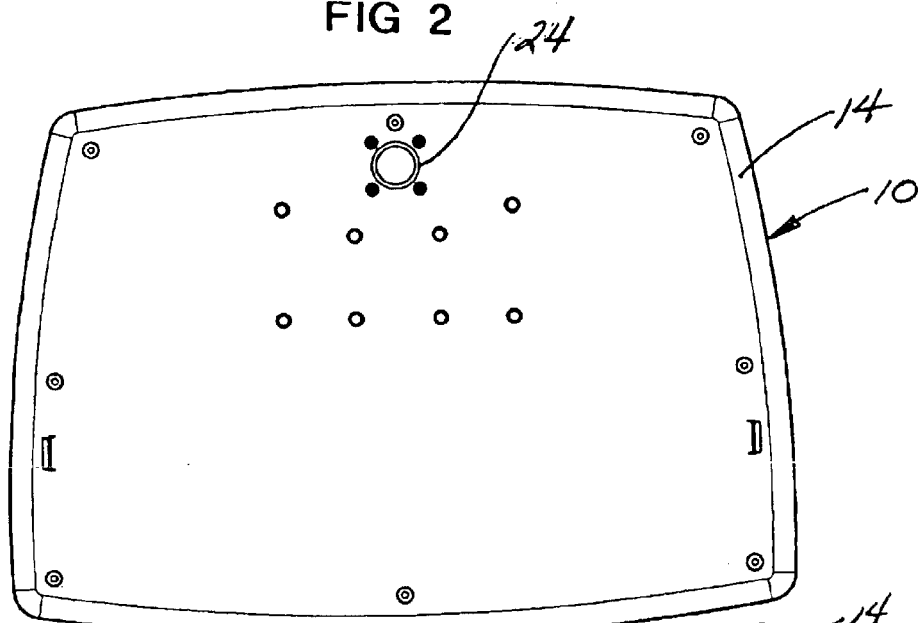
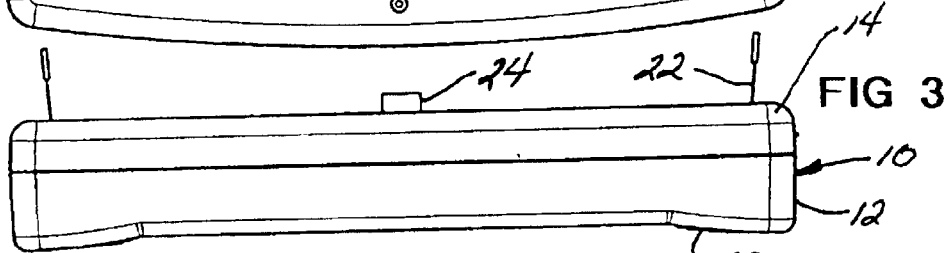
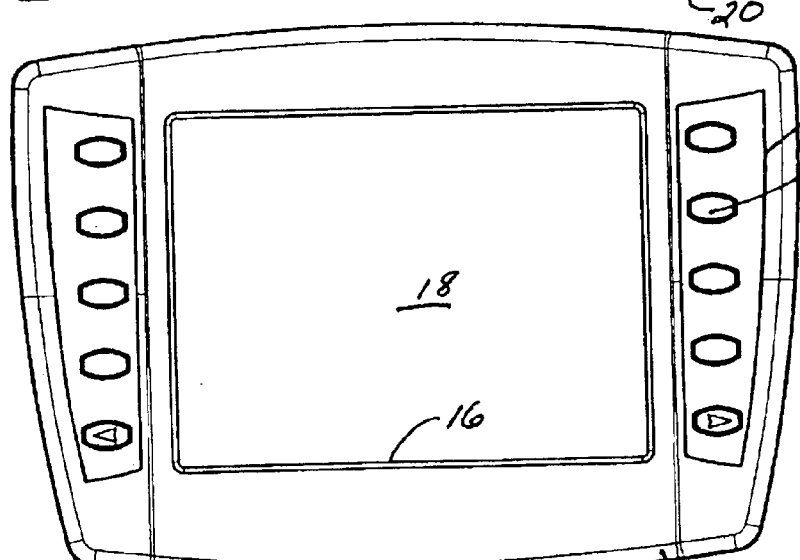
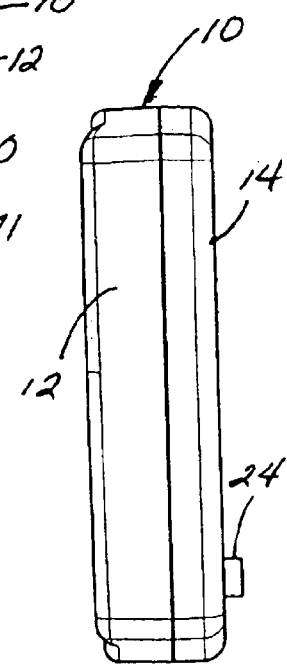

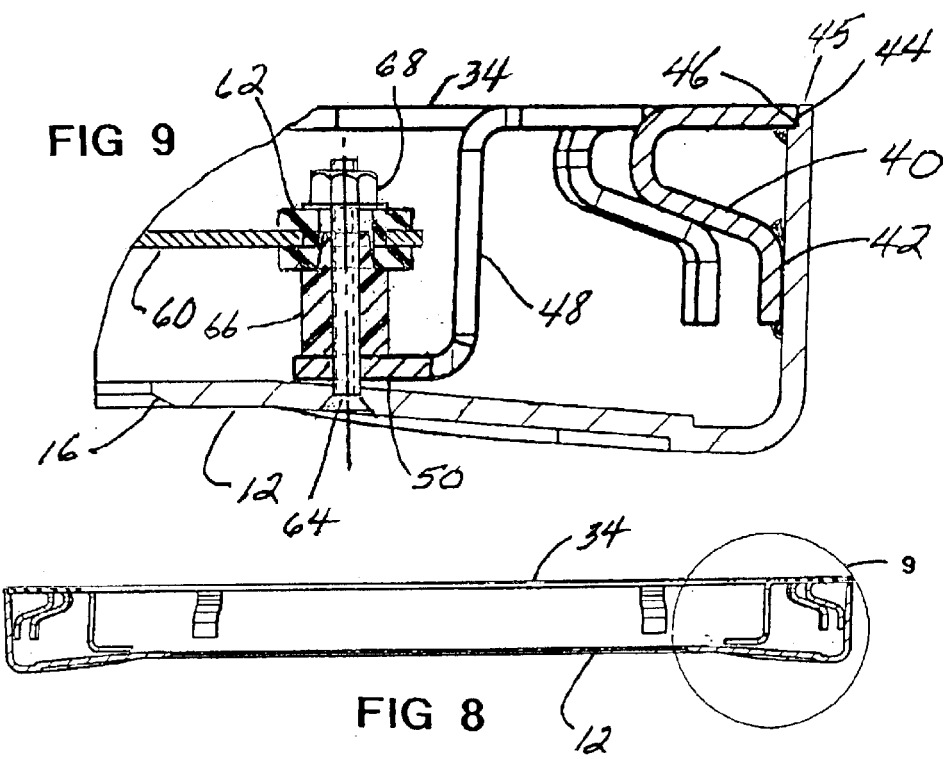
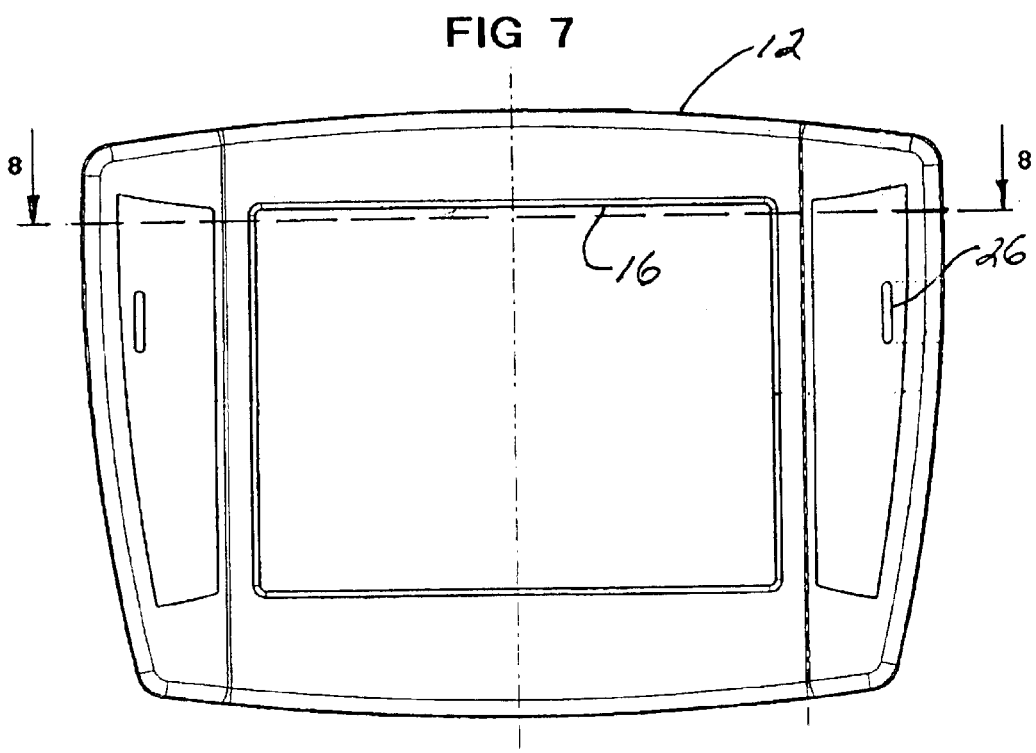

FIG 10
FIG 11
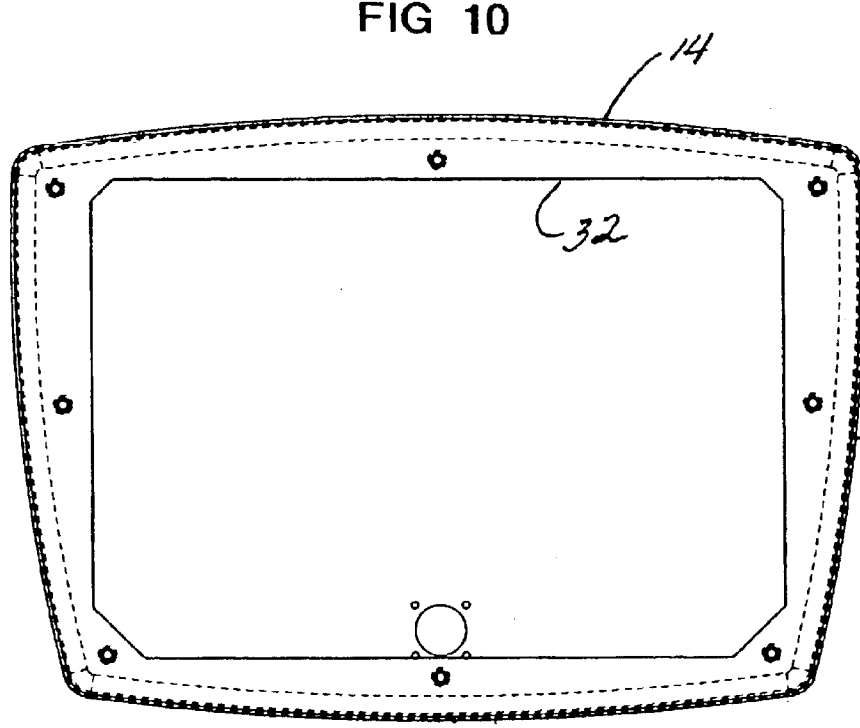
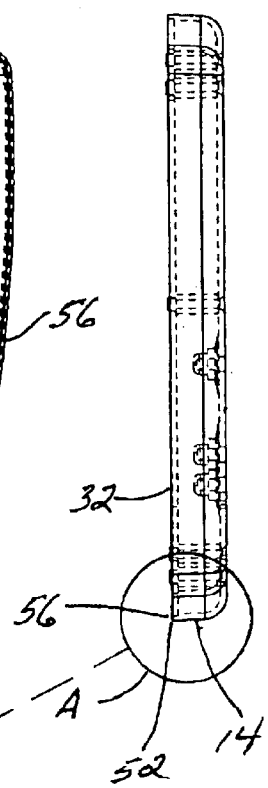
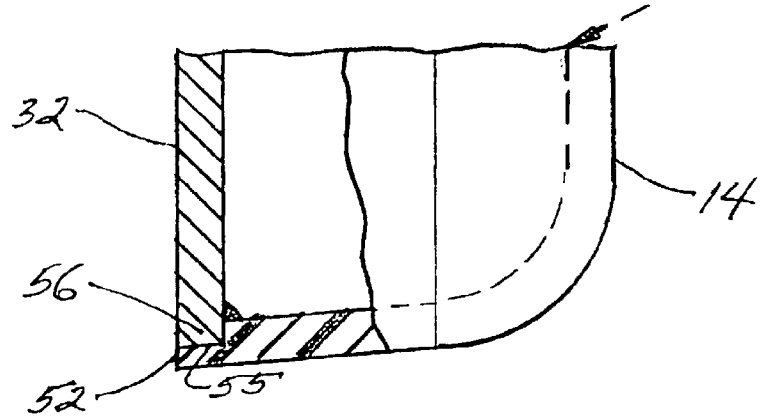

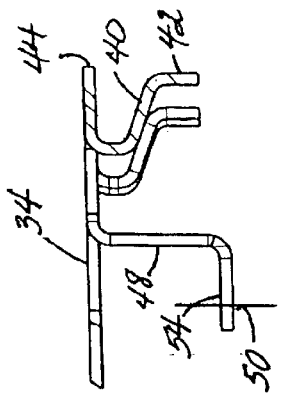
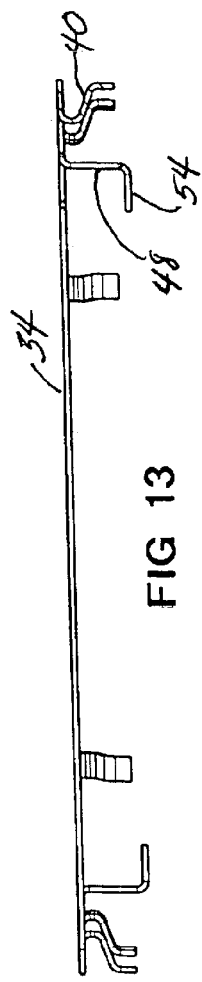
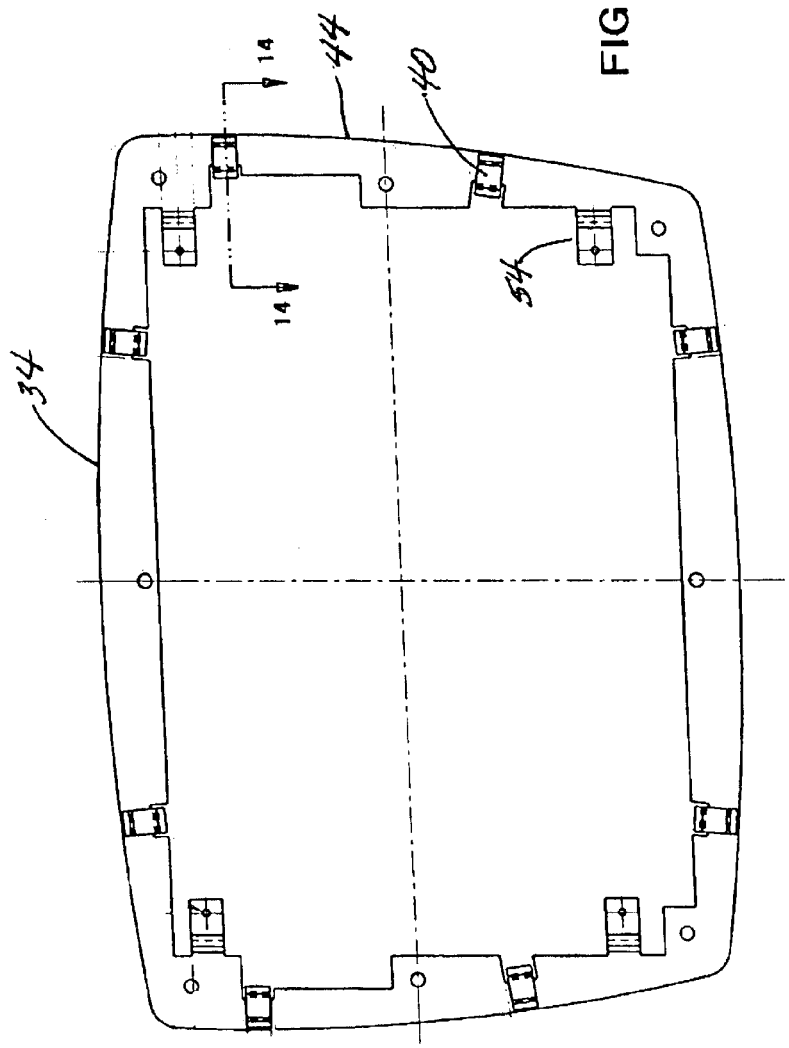

FIG 15
FIG 16
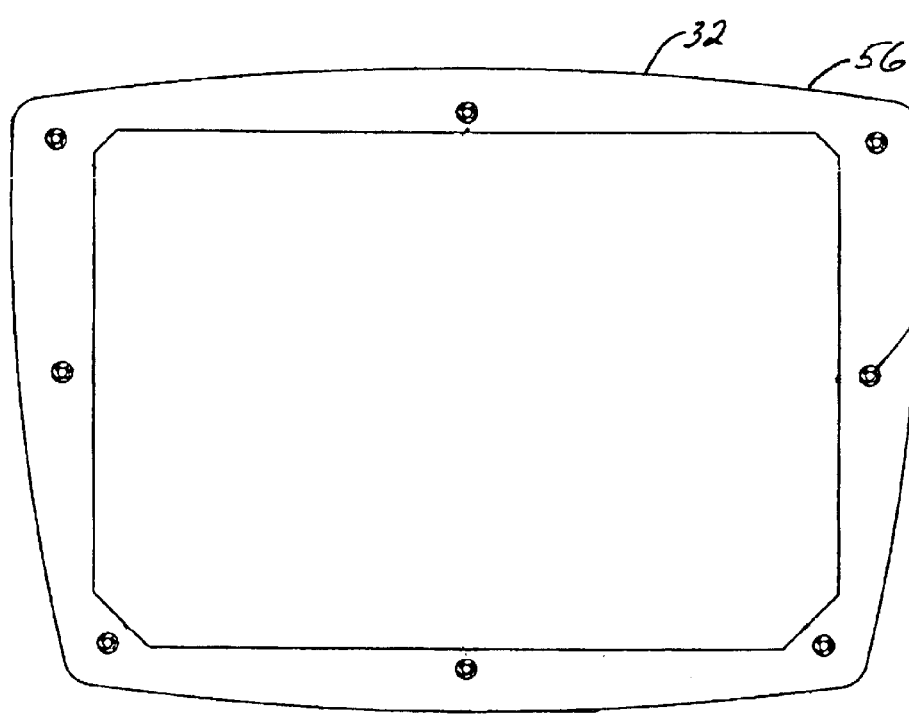
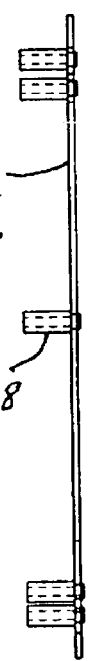

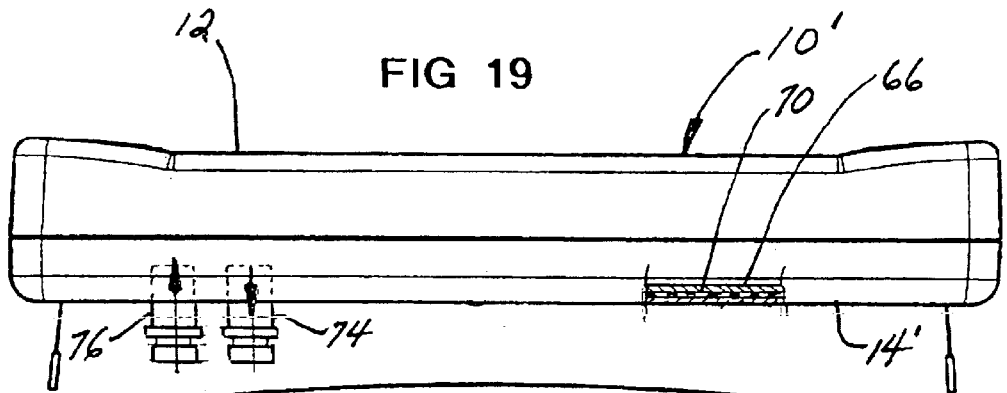
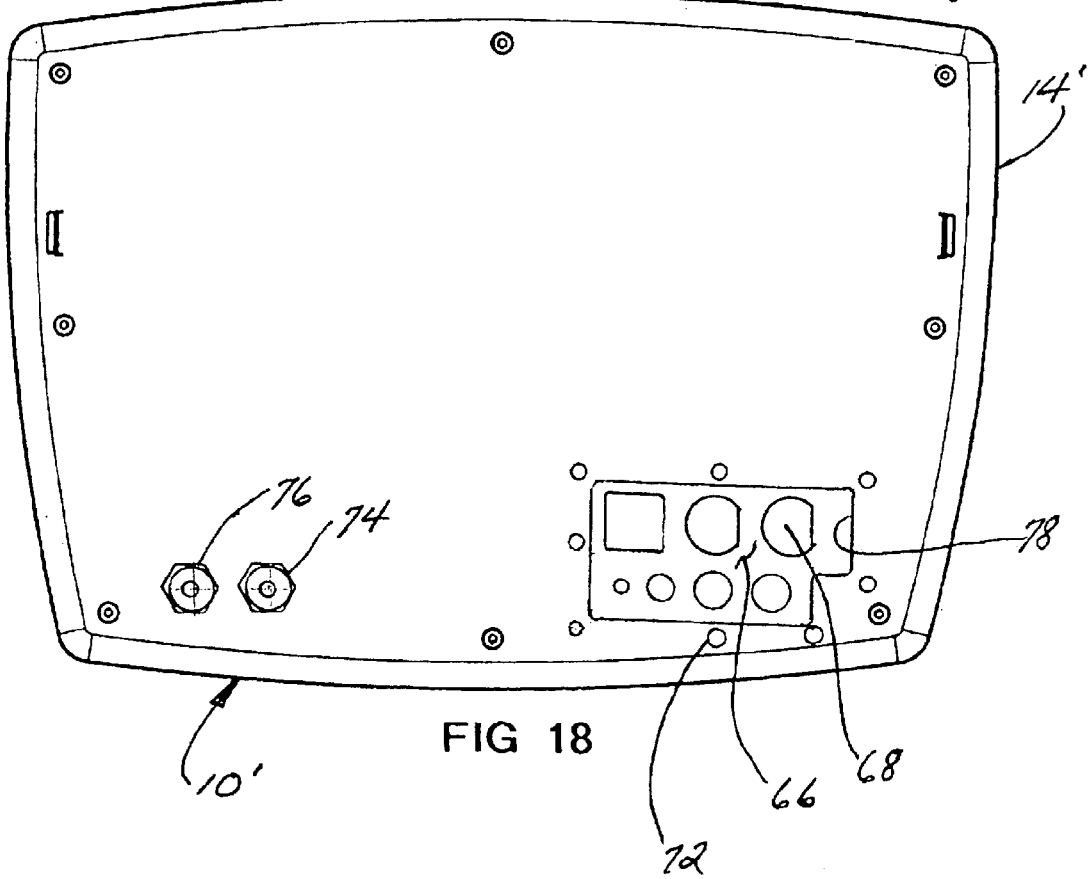

TABLET COMPUTER HOUSING AND METHOD OF CONSTRUCTION

CROSS-REFERENCE TO RELATED APPLICATIONS

None

STATEMENT REGARDING FEDERALLY SPONSORED RESEARCH OR DEVELOPMENT

None

INCORPORATION-BY-REFERENCE OF MATERIAL SUBMITTED ON A COMPACT DISC

None

BACKGROUND OF THE INVENTION

1. Field of the Invention

This invention relates generally to the construction of tablet, notebook and laptop-type computers, and more particularly to a tablet computer design requiring a sealed interior volume for electronic component protection and an improved universal mounting system for those electronics.

2. Description of Prior Art

Tablet computers are self contained units generally for specific purposes, environments and user needs and include a liquid crystal display screen (LCD) positioned in sealing engagement behind an aperture formed into the front housing of the housing assembly. Selected conventional electronics are positioned within the interior volume of the housing assembly with output connectors as required disposed through the central wall of the rear housing. A generally hermetically sealed interior volume is established by providing conventional sealing means between the liquid crystal display (LCD), the front and rear housings and external connectors of the tablet computer.

Conventionally, to support the various electronic components as desired, mounting tabs, posts and other supports are mechanically connected or adhered by high-strength epoxy to the inner back wall of the rear housing. However, if the electronics components change or must be relocated in any way, or the particular tablet computer design is to be adapted for another use, the components support elements attached to the rear housing must be re-engineered or redesigned and then attached to support the new design of the electronic component arrangement.

Establishing a reliable seal between the front and rear housing is also difficult to consistently achieve. By conventional mating means between housing halves, the limited surface area for establishing a seal therebetween is at best unreliable.

Moreover, a tablet computer may routinely be subjected not only to a hostile environment requiring a somewhat hermetic sealing of the interior volume, but also may be subject to excessive movement, vibration or impact which may damage delicate electronics contained within the housing assembly.

Yet another difficulty occurring with conventional tablet computers is providing a reliable means for the external connection of cables and other conduits necessary to provide power to, and signals from, the interior volume and the electronics therewithin. These connectors currently available tend to either provide inadequate sealing thus jeopardizing the sealed integrity of the interior volume or work loose in the rear housing under repeated use or movement.

Because the interior volume of these tablet computers is generally sealed hermetically from the exterior environment, there is also a tendency for static pressure or vacuum buildup therewithin as either the environment or the electronic components are heated or cooled excessively. It is thus beneficial, if not necessary, to provide a heretofore unavailable means for economically controlling the static pressure within the interior volume of tablet computers so as not to exceed the rupture limitation of the seals provided thus jeopardizing the integrity of the sealed interior volume.

The present invention provides more than adequate and reliable answers to all of these above limitations as will be described herebelow.

BRIEF SUMMARY OF THE INVENTION

This invention is related to a tablet computer housing assembly and housing construction method. A molded front housing has a planar perimeter margin and a front opening for viewing a LCD screen which is sealingly mounted within the housing assembly. A front sealing bracket having an open central portion is rigidly connected along an outer margin thereof to, and forms a seal with, the perimeter margin of the front housing. A molded rear housing having a planar perimeter margin and a rear sealing bracket and having an open central portion is rigidly connected to, and forms a seal with the perimeter margin of the rear housing. A flat compressible main sealing gasket having an open central portion is positioned between the front and rear sealing brackets to form a sealed connection therebetween whereby a sealed interior volume is established within the mating housings.

It is therefore an object of this invention to provide a tablet-type computer with a sealed interior volume and having improved structural aspects for both assembly and enhanced environment and vibration protection of electronic components contained therewith in.

It is still another object of this invention to provide an improved means for sealingly connecting the front and rear housings together mechanically to form a sealed interior volume of the housing assembly of a tablet computer.

Yet another object of this invention is to provide a universal chassis for supporting electronics components and the video display unit (VDU) which is easily adaptable to changes in electronic components and orientation thereof.

Still another object of this invention is to provide an improved means for sealingly connecting the input and output connectors attached to the rear housing which provide enhanced sealing engagement and a more universal mounting structure to accommodate a broad variety of connectors.

Another object of this invention is to provide a means for maintaining an internal static pressure and vacuum limit within the interior volume of a sealed tablet computer.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 1 is a front elevation view of the invention.

FIG. 2 is a rear elevation view of the invention shown in FIG. 1.

FIG. 3 is a top elevation view of the invention shown in FIG. 1.

FIG. 4 is a right end elevation view of the invention shown in FIG. 1.

FIG. 7 is a front elevation view of the front housing of the invention.

FIG. 8 is a section view in the direction of arrows 8—8 in FIG. 7 showing the front sealing bracket permanently connected thereto.

FIG. 9 is an enlargement of area 9 in FIG. 8.

FIG. 10 is an elevation view of the interior surface of the rear housing.

FIG. 11 is a side elevation view of FIG. 10 with an enlargement of area A also shown.

FIG. 12 is an elevation or plan view of the front sealing bracket.

FIG. 13 is a top view of FIG. 12.

FIG. 14 is an enlargement of one end of the front sealing bracket shown in FIG. 13.

FIG. 15 is a front elevation or plan view of the rear sealing bracket to be attached to the rear housing.

FIG. 16 is a side elevation view of FIG. 15.

FIG. 18 is a rear elevation view of an alternate embodiment of the rear housing.

FIG. 19 is a top plan view of FIG. 18.

DETAILED DESCRIPTION OF THE INVENTION

Figure 5:
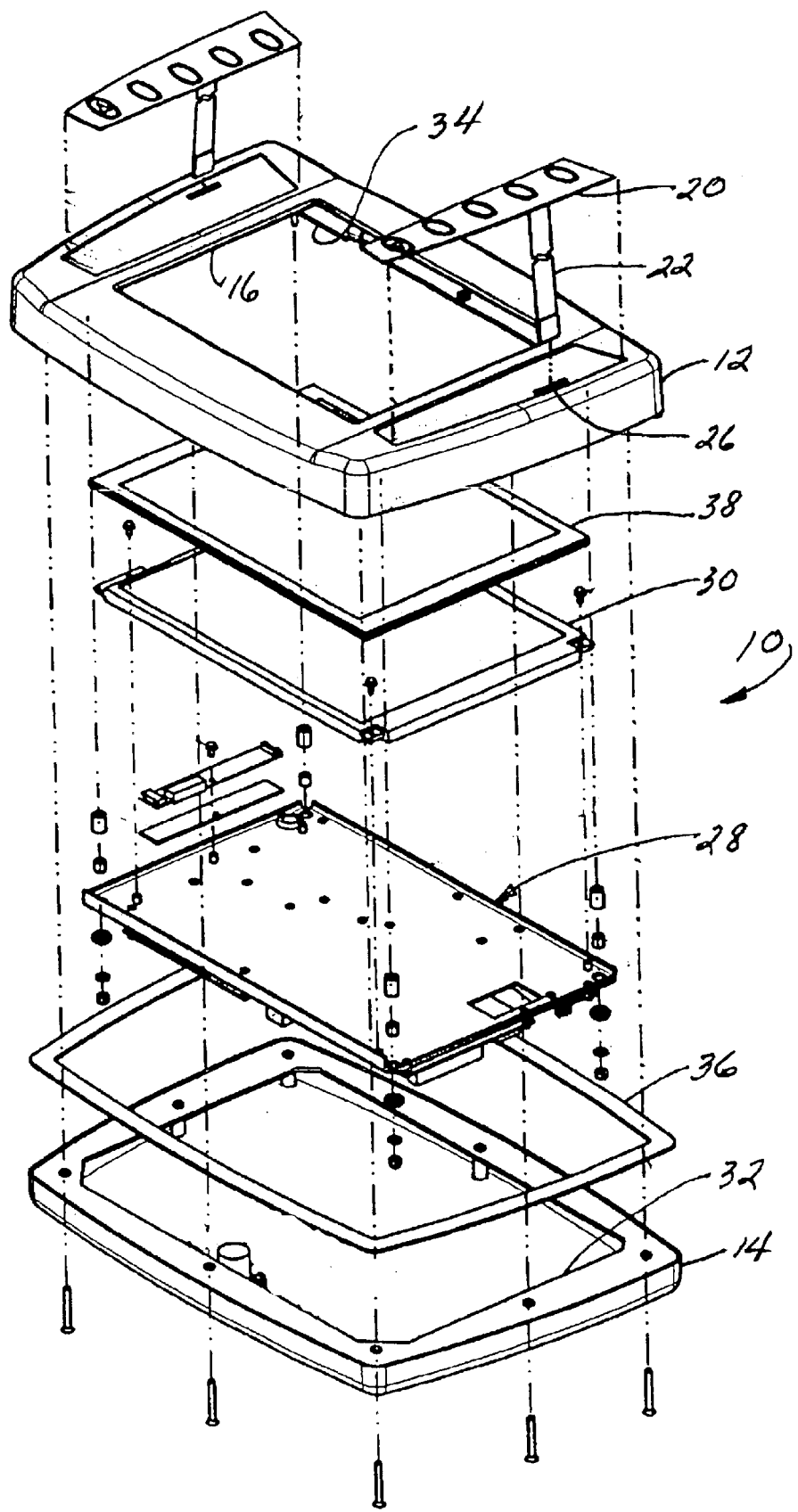
FIG. 5 is an exploded upper perspective view of the invention shown in FIG. 1.

Referring now to the drawings, and firstly to FIGS. 1 to 4, a tablet computer embodying aspects of the present invention is shown generally at numeral 10. This tablet computer 10 includes a molded thin wall front housing 12 which is matingly engaged with a molded rear housing 14. Both of these housings 12 and 14 are formed by compression mold techniques of thin wall graphite epoxy having a nominal thickness of 0.10". The molded front housing 12 includes a front opening 16 sized to provide viewability of a liquid crystal display (LCW) 18 which is connected within the interior volume in alignment and registry with the front opening 16.

VDU flexible membrane keyboards 20 are provided to facilitate use and control of the control buttons 21 of the tablet computer 10 itself. Elongated tabs 22 which matably engage through slots 26 formed in the front housing 12, facilitate installation and retention. An output connector 24 is shown to represent a typical arrangement for establishing electrical communication between the interior electronics components and exterior cable connected thereto.

Figure 6:
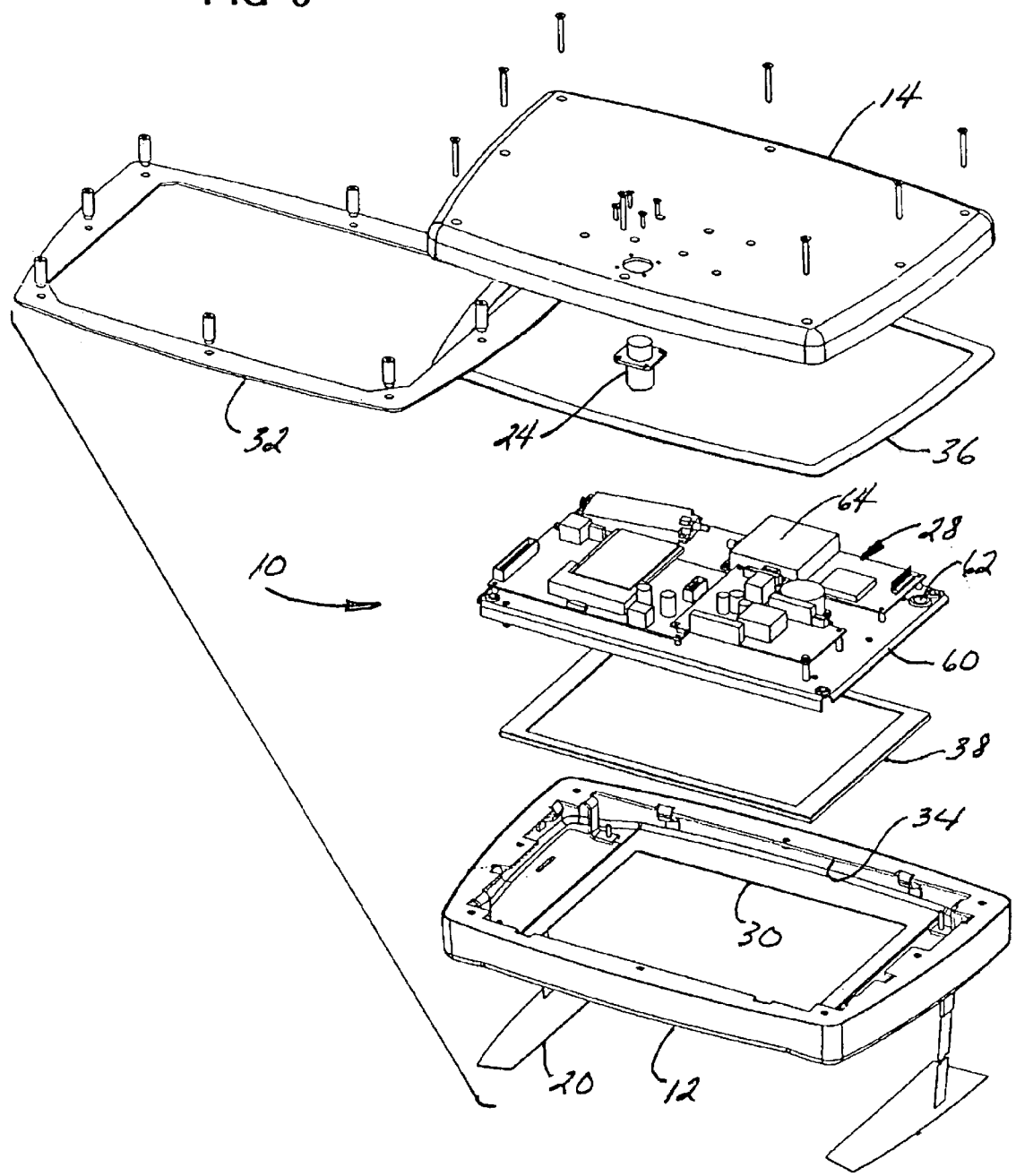
FIG. 6 is an exploded lower perspective view of the invention shown in FIG. 1.
Figure 17:
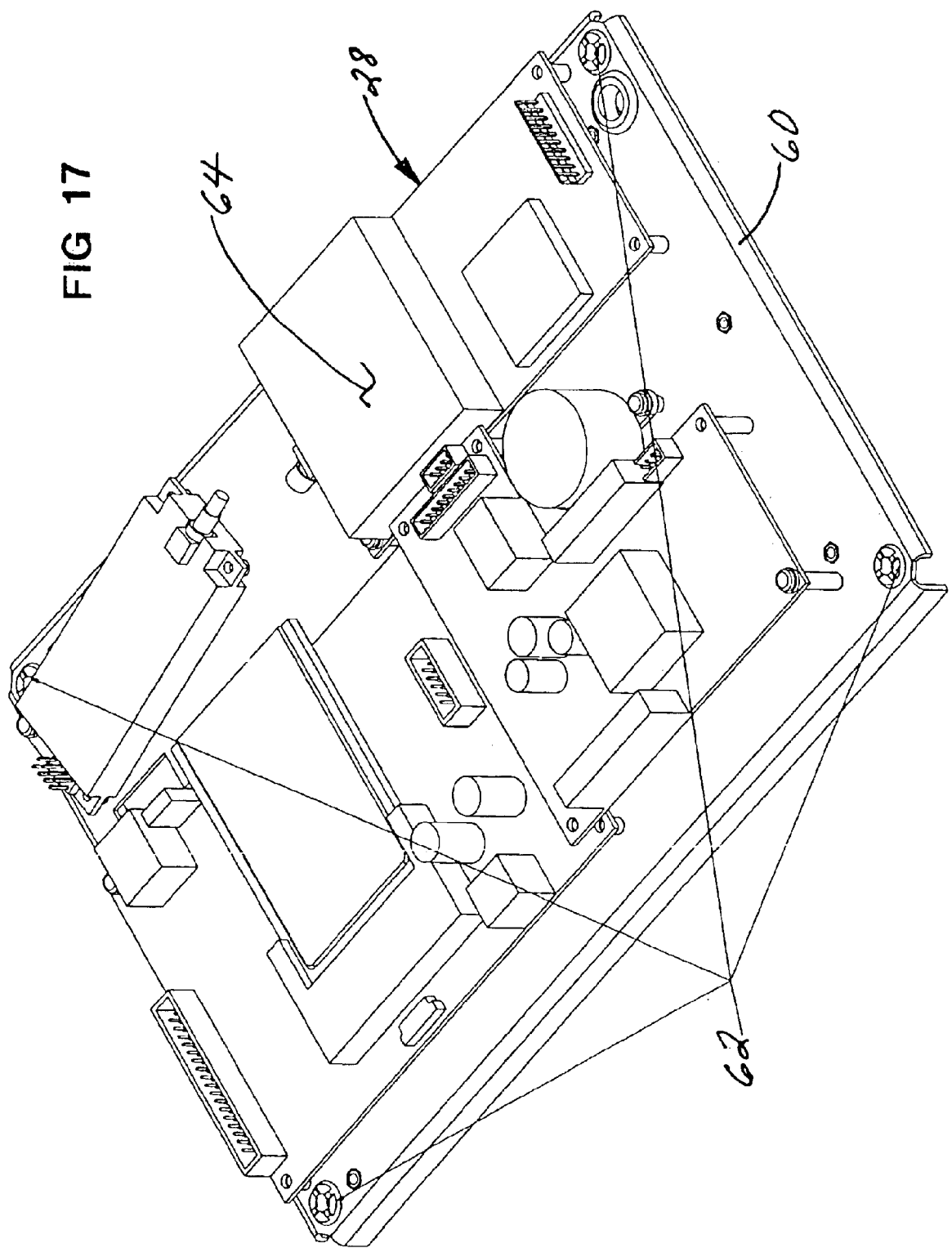
FIG. 17 is a perspective view of the electronics chassis with a typical array of electronics components attached thereto and showing the vibration isolation mounting arrangement therefor.

Referring also to FIGS. 5 and 6, the LCD is shown generally at numeral 30 sealingly engaged against an LCD window with mounting adhesive 38. This mounting adhesive 38, in combination with the fasteners shown, secure the LCD 30 against and in alignment with the opening 16 of the front housing 12.

A VDU chassis assembly 28 is positioned immediately adjacent one side of the LCD 30 and is mounted in vibration isolation fashion by grommets 62 against the inner surface of the front housing 12 as described herebelow. The VDU chassis assembly 28 includes conventional electronics 64 necessary to support the desired functions and features of the tablet computer 10 and a universal electronics component mounting chassis 60 which is mounted for vibration isolation via elastomeric or polymeric resilient grommets 62 described more fully herebelow.

Establishing and maintaining secure alignment and sealing contact between the front and rear housings 12 and 14, respectively is effectively accomplished by the invention as best seen in FIGS. 7 to 15. A front sealing bracket 34 is uniquely permanently connected to the front housing 12 while a rear sealing bracket 32 is permanently and sealingly connected to the rear housing 14. Each of these sealing brackets 32 and 34 are formed of generally flat rigid high strength aluminum alloy 6061-T6 having a thickness of 0.09". Self-clinching studs and nuts are utilized where shown. Each of these sealing brackets 32 and 34 are permanently bonded into precisely mating grooves 46 formed into the distal edge of the front housing 12 as best seen in FIG. 9 and the groove 56 formed into the distal edge of rear housing 14 as best seen in FIG. 11. When these housings 12 and 14 are mated together with an elastomeric main sealing gasket 36 positioned between the sealing flanges 34 and 34, complete air and water tight sealing is achieved.

Each of the perimeter margins 44 and 55 of the front and rear sealing brackets sealing brackets 34 and 32, respectively, precisely mates into the grooves 46 and 56 of the perimeter margins 45 and 52 of front and rear housings 12 and 14, respectively and are bonded into place using CLICKBOND AB359 epoxy structural adhesive.

To further strengthen the important permanent, sealed attachment between the front sealing bracket 34 and the front housing 12, spaced apart attaching tabs 40, which are formed as a unit with the front sealing bracket 34, are also provided. Each of these attaching tabs 40 includes a generally orthogonally oriented attachment pad 42 which is configured to mate against the inner surface of the flange or outer perimeter portion of the front housing 12. Again, CLICKBOND adhesive is utilized to establish a permanent bond of each of the attachment pads 42 as shown in FIG. 9.

Referring now to FIGS. 9, 12 to 14 and 17, the vibration isolation mounting of the removable universal electronics component mounting chassis 60 will now be described. Again, this chassis 60 is of a universal nature wherein the electronic components shown typically at 64 may be selected for the desired purpose and function of each particular tablet computer design. Instead of having to reestablish different mounting members attached to the inner surface of the rear housing 14, the chassis 60 is simply reconfigured in establishing holes and self-clinching studs and nuts for mounting the various components as desired.

Importantly, this chassis 60 is vibration isolation supported within the interior volume of the tablet computer 10 by appropriate attachment to both the front housing 12 and the front sealing bracket 34. The front sealing bracket 34 also includes mounting tabs 48 which are formed as a unit with the front sealing bracket 34 having an offset distal mounting portion 50 which is drilled to receive mounting screws 64 by threadable engagement to attach the mounting tab 50 securely against the inner surface of the front housing 12.

A plastic or nylon offset 66 positions the chassis 60 as desired centrally between the inner surface of the front housing 12 and the front sealing bracket 34. At each corner of the chassis is a resilient grommet 62 which may be formed of elastomeric or resilient plastic material as desired. Each of these grommets 62 is secured within a suitably sized hole formed into the corners of the chassis 60. Each of the offsets 66 includes a conical distal portion which matably engages into the center aperture of the corresponding grommet 62. A jam nut 68 is lockingly engaged onto the end of the elongated threaded fastener 64 preferably against a washer for more uniform compression of the grommet 62.

By this arrangement of vibration isolation mounting of the chassis 60, the universality of the chassis 60 is enhanced for virtually limitless mounting of electronic components thereatop without concern for the high expense of relocating the assembly fasteners which are typically attached to the inner surface of the rear housing. The chassis 60 and the entire chassis assembly 28 is easily removable for alteration or repair of the electronic components 64.

Referring now to FIGS. 18 and 19, an alternate and preferred embodiment of the tablet computer is there shown at 10'. In this embodiment 10', the rear housing 14' is modified as follows. To facilitate the weather-tight, air-tight sealing of the rear connectors necessary to move signals and power back and forth from the interior volume of the tablet computer 10', a connector mounting plate 66 formed of high strength aluminum stock is provided. A number of suitably formed connector apertures 68 are formed into this plate 66 which is made attachable and removable by conventional fasteners (not shown).

To establish the sealing engagement of this connector mounting plate 68, a compressible elastomeric gasket 70 configured to match the overlapping mounting surface between the aperture 78 formed into the rear housing 14' and the outer perimeter portion of the connector mounting plate 66 is provided. When fasteners shown typically at 72 are properly evenly tightened, a water-tight seal is there established. Once the conventional airtight connectors are mounted and secured within the appropriate connector mounting apertures 68, a fully air-tight and weather-tight seal is established.

In circumstances which result in the heating of the interior volume by the electronics components contained therein or by the increased exterior environmental temperature and which might otherwise cause excess static pressure to build within the interior volume to a point where the above-described sealing means would be compromised, the internal static pressure is automatically maintained at a level not to exceed, preferably, 5 psi below the predetermined rupture pressure of the seals of the housing assembly. In other cold environmental circumstances, a detrimental vacuum static pressure may also occur within the interior volume.

Static pressure limits are established both at a high and a low pressure setting of 5 psi below rupture and 10.0 psi, a slight vacuum pressure, by two oppositely acting pressure valves 74 and 76 which are sealingly engaged by threading into the rear housing 14' as shown. These pressure valves 74 and 76 are of a conventional spring loaded check ball nature allowing air to enter into the interior volume should a vacuum condition occur and, more likely, from the interior volume should a pressure build-up occur which would threaten the integrity of the sealing members of this invention as previously described.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A tablet computer housing assembly comprising:
   a molded front housing having a substantially planar perimeter margin and a front opening formed into a central panel thereof for viewing a LCD screen sealingly mounted within said housing assembly;
   a separate generally flat rigid front sealing bracket having an open central portion and connected along an outer margin thereof to, and forming a seal with, said perimeter margin of said front housing;
   a molded rear housing having a substantially planar perimeter margin;
   a separate generally flat rigid rear sealing bracket having an open central portion connected to, and forming a seal with said perimeter margin of said rear housing;
   each of said sealing brackets having a width which is substantially greater than a thickness of each corresponding said perimeter margin;
   a flat compressible main sealing gasket having an open central portion positioned between said front and rear sealing brackets and matingly engaged together to form a sealed connection therebetween whereby a substantially sealed interior volume is defined within and between said front and rear housings for protectively mounting electronic components therewithin.

2. A tablet computer housing assembly as set forth in claim 1, wherein:
   said front and rear sealing brackets are each sealingly connected to said front and rear housings, respectively, by permanently bonding corresponding perimeter margins of each of said front and rear sealing brackets into a mating groove formed into each perimeter margin of each of said housings.

3. A tablet computer housing assembly as set forth in claim 2, wherein said front sealing bracket further includes:
   generally orthogonally extending spaced attaching tabs each having a substantially flat distal attachment pad in permanent adhesive contact with an inner surface of said front housing adjacent said perimeter margin thereof.

4. A tablet computer housing assembly as set forth in claim 1, further comprising:
   a removable universal electronics component mounting chassis formed as a substantially flat panel connected within said interior volume;
   said chassis adapted for receiving and securement thereon of substantially any selected electronics mounting arrangement;
   said chassis connected to one of said housings with resilient vibration isolation therebetween to reduce the effects of housing assembly multi-directional vibration and impact upon the electronics components.

5. A tablet computer housing assembly as set forth in claim 1, further comprising:
   a pressure regulator arrangement sealingly connected through a wall of one said housing whereby static air pressure in said interior volume is maintained at a level not to exceed a seal rupture pressure of said housing assembly.

6. A tablet computer housing assembly as set forth in claim 1, further comprising:
   a removable outlet panel sealingly connected from within said interior volume against a similarly sized aperture formed through said rear housing;
   said outlet panel including electronics outlet connector apertures each for sealingly receiving an outlet connector sealingly mounted therethrough whereby a mating external cable may be connected to an external portion of a corresponding said outlet connector while maintaining an airtight condition in said interior volume.

7. A tablet computer having a sealed interior volume for hermetically protecting electronic components therein comprising:

a molded front housing having a substantially planar perimeter margin and a front opening formed into a central panel thereof for viewing a LCD screen sealingly mounted within said housing assembly;

a separate generally flat rigid front sealing bracket having an open central portion and connected along an outer margin thereof to, and forming a seal with, said perimeter margin of said front housing;

a molded rear housing having a substantially planar perimeter margin;

a separate generally flat rigid rear sealing bracket having an open central portion connected to, and forming a seal with said perimeter margin of said rear housing;

each of said sealing brackets having a width which is substantially greater than a thickness of each corresponding said perimeter margin;

a flat compressible main sealing gasket having an open central portion positioned between said front and rear sealing brackets and matingly engaged together to form a sealed connection therebetween whereby a substantially sealed interior volume is defined within and between said front and rear housings for protectively mounting electronic components therewithin;

a removable universal electronics component mounting chassis formed as a substantially flat panel connected within said interior volume;

said chassis adapted to receive substantially any selected electronics mounting arrangement attached thereto;

said chassis connected to one of said housings with resilient vibration isolation therebetween to reduce the effects of housing assembly vibration and impact upon the electronics components.

8. A tablet computer housing assembly as set forth in claim 7, wherein:

said front and rear sealing brackets are each sealingly connected to said front and rear housings, respectively, by permanently bonding corresponding perimeter margins of each of said front and rear sealing brackets into a mating groove formed into each perimeter margin of each of said housings.

9. A tablet computer housing assembly as set forth in claim 8, wherein said front sealing bracket further includes:

generally orthogonally extending spaced attaching tabs each having a substantially flat distal attachment pad in permanent adhesive contact with an inner surface of said front housing adjacent said perimeter margin thereof.

10. A tablet computer housing assembly as set forth in claim 7, further comprising:

a pressure regulator arrangement sealingly connected through a wall of one said housing whereby static air pressure in said interior volume is maintained at a level not to exceed a seal rupture pressure of said housing assembly.

11. A method of releasably sealing connecting front and rear housings together to form a tablet computer housing assembly comprising the steps of:

A. providing a molded front housing having a substantially planar perimeter margin and a front opening formed into a central panel thereof for viewing a LCD screen sealingly mounted within said housing assembly;

B. providing a generally flat rigid front sealing bracket having an open central portion;

C. rigidly connecting said front sealing bracket along an outer margin thereof to, and forming a seal with, said perimeter margin of said front housing;

D. providing a molded rear housing having a substantially planar perimeter margin;

E. providing a generally flat rigid rear sealing bracket having an open central portion thereof;

F. rigidly connecting said rear sealing bracket to, and forming a seal with said perimeter margin of said rear housing;

G. providing a flat compressible main sealing gasket having an open central portion thereof;

H. positioning said main sealing gasket between said front and rear sealing brackets and matingly engaging said housings together to form a sealed connection therebetween whereby a substantially sealed interior volume is defined within and between said front and rear housings for protectively mounting electronic components therewithin.

12. The method of claim 11, further comprising the step of:

I. before step A, forming a groove into and entirely along perimeter margins of each of said housings, each said groove sized to snugly matably receive the corresponding said sealing bracket.

13. The method of claim 12, further comprising the steps of:

J. before step B, forming orthogonally extending spaced tabs from adjacent to said outer margin of said front sealing bracket, each said tab having a substantially flat distal attachment portion positioned against an inner wall surface of said front housing;

K. permanently bonding each said attachment portion against the inner wall surface of said front housing simultaneous with step C.

14. A tablet computer housing assembly comprising:

a molded front housing having a substantially planar perimeter margin and a front opening formed into a central panel thereof for viewing a LCD screen sealingly mounted within said housing assembly;

a separate generally flat rigid front sealing bracket having an open central portion and connected along an outer margin thereof to, and forming a seal with, said perimeter margin of said front housing;

a molded rear housing having a substantially planar perimeter margin;

a separate generally flat rigid rear sealing bracket having an open central portion connected to, and forming a seal with said perimeter margin of said rear housing;

each of said sealing brackets having a width which is substantially greater than a thickness of each corresponding said perimeter margin;

a flat compressible main sealing gasket having an open central portion positioned between said front and rear sealing brackets and matingly engaged together to form a sealed connection therebetween whereby a substantially sealed interior volume is defined within and between said front and rear housings for protectively mounting electronic components therewithin;

said front and rear sealing brackets are each sealingly connected to said front and rear housings, respectively, by connecting corresponding perimeter margins of each of said front and rear sealing brackets into a mating groove formed into each perimeter margin of each of said housing.

* * * * *